United States Patent [19]
Nakamura et al.

[11] Patent Number: 5,699,597
[45] Date of Patent: Dec. 23, 1997

[54] METHOD OF MANUFACTURING A TANTALUM SOLID STATE ELECTROLYTIC CAPACITOR

[75] Inventors: Shinji Nakamura; Chojiro Kuriyama, both of Kyoto, Japan

[73] Assignee: Rohm Co., Ltd., Kyoto, Japan

[21] Appl. No.: 452,433

[22] Filed: May 26, 1995

[30] Foreign Application Priority Data

May 30, 1994 [JP] Japan .................... 6-116351

[51] Int. Cl.$^6$ ........................... H01G 9/012
[52] U.S. Cl. ........................... 29/25.03
[58] Field of Search ................ 29/25.03; 205/124, 205/171, 188, 322

[56] References Cited

U.S. PATENT DOCUMENTS

| | | |
|---|---|---|
| 3,956,676 | 5/1976 | Vierow et al. |
| 4,231,075 | 10/1980 | Morimoto et al. |
| 4,488,941 | 12/1984 | Love ............... 205/134 |
| 5,036,434 | 7/1991 | Kobayashi. |
| 5,483,415 | 1/1996 | Nakamura ............. 361/529 |

FOREIGN PATENT DOCUMENTS

| | | |
|---|---|---|
| 633 583 A1 | 1/1995 | European Pat. Off. |
| 0 654 805 A2 | 5/1995 | European Pat. Off. |
| 747051 | 3/1956 | United Kingdom. |
| 885362 | 12/1961 | United Kingdom. |
| 2032691A | 5/1980 | United Kingdom. |

Primary Examiner—John Niebling
Assistant Examiner—Brendan Mee
Attorney, Agent, or Firm—Nikaido Marmelstein Murray & Oram LLP

[57] ABSTRACT

The use of a wire of a metal other than tantalum as a lead wire fixed to a chip formed by sintering tantalum powder is enabled. Prior to the formation of a dielectric film on a chip through anodic oxidation, an insulating material is applied to a surface of the lead wire fixed to the chip at a connection with the chip. With the application of the insulating material, a short circuit between the lead wire and a chemical conversion solution is prevented when the entire chip is drenched in the chemical conversion solution in anodic oxidation, so that a dielectric film of tantalum pentoxide is surely formed on the chip. As the lead wire, an arbitrary metal having conductivity may be used.

6 Claims, 6 Drawing Sheets

METHOD OF MANUFACTURING A TANTALUM SOLID STATE ELECTROLYTIC CAPACITOR

BACKGROUND OF THE INVENTION

1. Field of the Invention

The present invention relates to a method of manufacturing a capacitor device for a tantalum solid state electrolytic capacitor.

2. Description of the Prior Art

In manufacturing a capacitor device for a tantalum solid state electrolytic capacitor, for example, the following method has conventionally been employed as described in Japanese Laid-open Patent application No. S50-160769, etc.:

Specifically, first, as shown in FIG. 1, a tantalum made lead wire 2 serving as the anode is fixed to a chip 1 formed by hardening and shaping tantalum powder to be porous and sintering it, or the chip 1 is hardened and shaped to be porous and sintered with a part of the lead wire 2 being imbedded in the chip 1. Then, as shown in FIG. 2, a dielectric film 3 of tantalum pentoxide is formed on the surface of each tantalum powder of the chip 1 by drenching the porous chip 1 in a chemical conversion solution A such as an aqueous solution of phosphoric acid so that the chemical conversion solution A infiltrates into the chip 1 and by applying a direct current between the lead wire 2 and the chemical conversion solution A under this condition to cause anodic oxidation.

Then, the chip 1 is drenched in an aqueous solution of manganese nitrate and taken out therefrom to be sintered. By repeating this a plurality of times, a layer of a solid state electrolyte such as manganese dioxide is formed on the surface of the dielectric film 3 of tantalum pentoxide. Then, a graphite layer and a cathode electrode film including a layer of a metal such as silver or nickel are formed on the surface of the solid state electrolytic layer of manganese dioxide.

In the conventional manufacturing method, however, as the lead wire 2 serving as the anode, a tantalum made wire is necessarily used which is made of the same material as the tantalum powder of the chip 1.

The reason is as follows: When a wire made of a metal other than tantalum such as copper or aluminum is used as the lead wire 2 for the chip 1 formed by sintering the tantalum powder, in causing the anodic oxidation shown in FIG. 2, a short circuit phenomenon of current occurs at a portion of the copper or aluminum made metallic wire which is directly in contact with the chemical conversion solution. Since a large current flows between the metallic wire and the chemical conversion solution, no current flows through the tantalum powder of the chip 1, so that the anodic oxidation cannot be caused to the tantalum powder. As a result, the dielectric film of tantalum pentoxide cannot be formed on each tantalum powder.

That is, in the case of the tantalum solid state electrolytic capacitor, in manufacturing its capacitor device, a wire made of tantalum which is the same material as that of the powder is necessarily used as the lead wire fixed to the chip of the capacitor device. Since tantalum is an expensive rare metal, the manufacture cost largely increases.

SUMMARY OF THE INVENTION

An object of the present invention is to reduce the manufacture cost by enabling the use of a wire of a metal other than tantalum as the lead wire of the chip formed by sintering tantalum powder.

To achieve the above-mentioned problem, according to the present invention, in a capacitor device manufacturing method in which a dielectric film is formed through anodic oxidation on a surface of a tantalum sintered body to which a lead wire is fixed, a solid state electrolytic layer is formed on a surface of the dielectric film and a cathode electrode film is formed on a surface of the solid state electrolytic layer, after an insulating material is applied to a surface of the lead wire at a connection with the tantalum sintered body, the tantalum sintered body and a part of the surface of the lead wire to which the insulating material is applied are drenched in a chemical conversion solution, and a current is applied between the lead wire and the chemical conversion solution to cause anodic oxidation.

The insulating material may be applied to an end surface of the tantalum sintered body to which the lead wire is fixed, continuously from the surface of the lead wire. In that case, the insulating material is infiltrated into the tantalum sintered body.

Moreover, after anodic oxidation is performed to the tantalum sintered body having the insulating material on the end surface, the lead wire is cut at the connection with the tantalum sintered body. After the lead wire is cut, an anode electrode film may be formed on the end surface.

By applying the insulating material to the surface of the lead wire at the connection with the tantalum sintered body, anodic oxidation is caused on the entire surface of the tantalum sintered body without the lead wire being directly in contact with the chemical conversion solution. Since there is no direct electrical connection between the lead wire and the chemical conversion solution, an arbitrary conductive metal may be used as the material of the lead wire.

When the insulating material is also applied to the end surface of the tantalum sintered body to which the lead wire is fixed, the end surface is provided with electrically insulating capability, and when the insulating material is infiltrated into the tantalum sintered body, the end surface and the side surface adjacent thereto are surely insulated. In such a structure, even if a metallic film is formed on the end surface to which the insulating material is applied, the solid state electrolytic layer on the side surface is never electrically connected to the metallic film.

By cutting and removing the lead wire after the anodic oxidation, a small size capacitor having no lead wire is obtained. When an anode electrode film is formed on the end surface where the lead wire has been cut, since the electrical connection with the solid state electrolytic layer on the side surface is prevented as described above, no short circuit occurs.

BRIEF DESCRIPTION OF THE DRAWINGS

This and other objects and features of this invention will become clear from the following description, taken in conjunction with the preferred embodiments with reference to the accompanied drawings in which.

3

Figure 6:
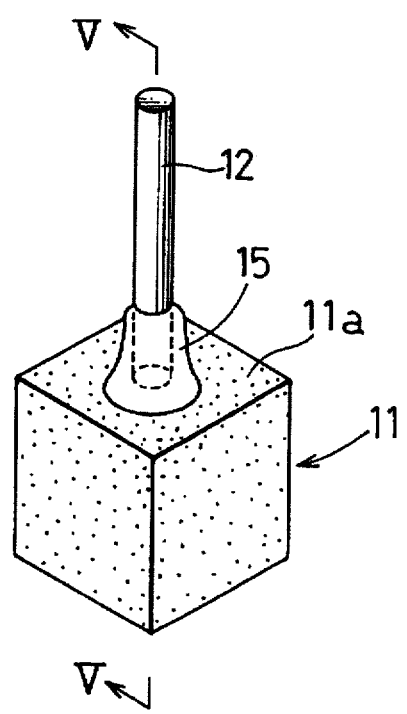
Figure 7:
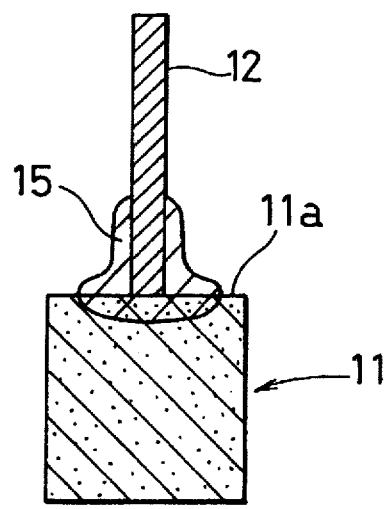
Figure 8:
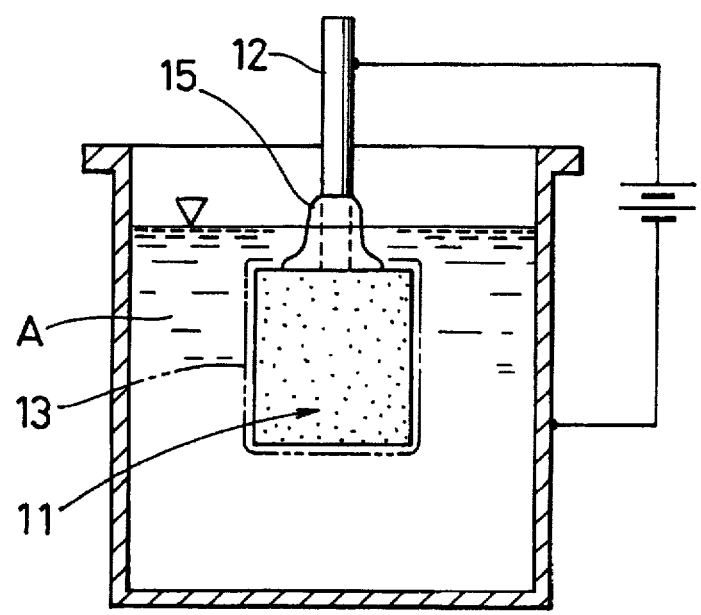
Figure 9:
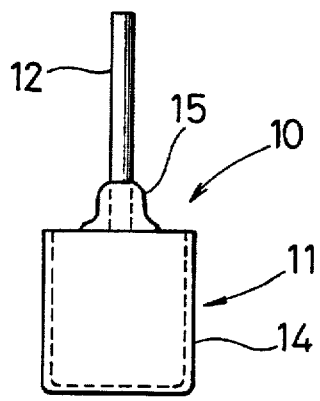
Figure 10:
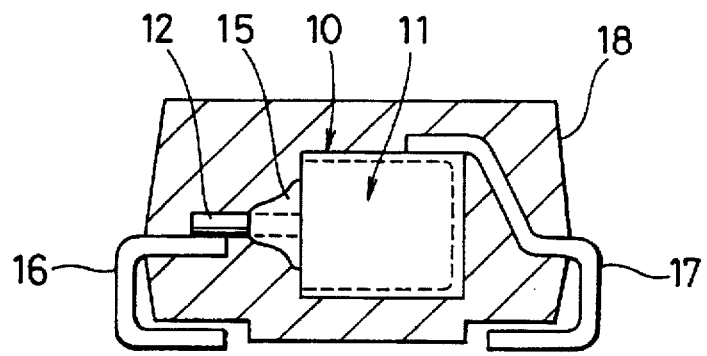
Figure 11:
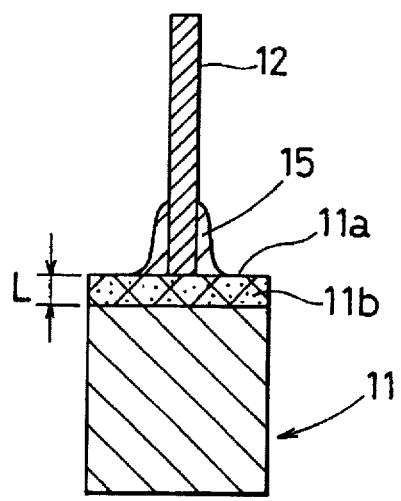
Figure 12:
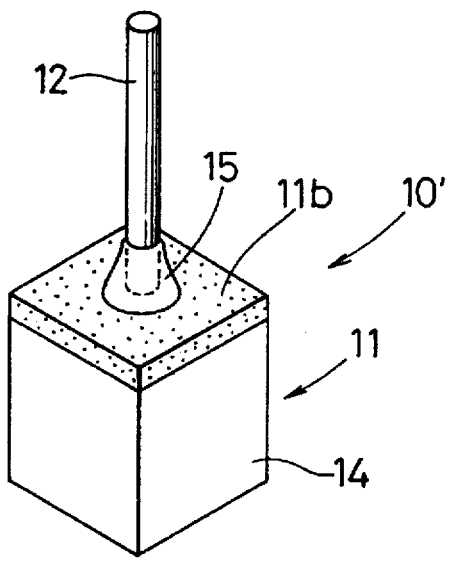
Figure 13:
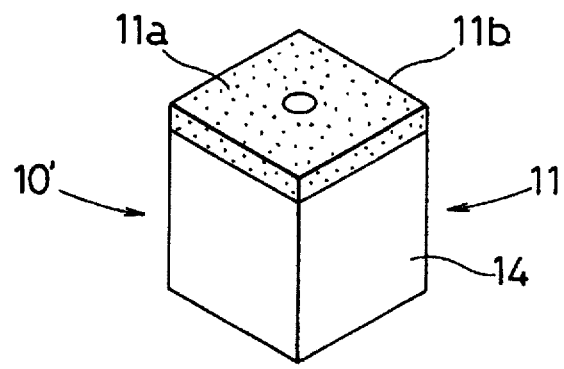
Figure 14:
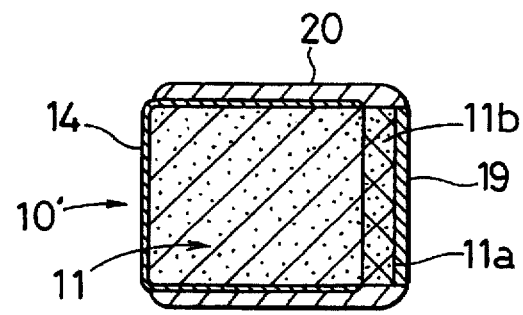

FIG. 6 is a perspective view showing the condition where an insulating material is applied to the lead wire fixed to the chip;

FIG. 7 is a cross-sectional view taken on line V—V of FIG. 6;

FIG. 8 is a cross-sectional view showing the condition where anodic oxidation is caused;

FIG. 9 is a front view of a capacitor device;

FIG. 10 is a front longitudinal sectional view of a tantalum solid state electrolytic capacitor using the capacitor device according to the first embodiment;

FIG. 11 is a cross-sectional view showing the condition where an insulating material is applied to a lead wire fixed to a chip in a second embodiment of the present invention;

FIG. 12 is a perspective view of a capacitor device according to the second embodiment;

FIG. 13 is a perspective view showing the condition where the lead wire is removed in the capacitor device according to the second embodiment; and FIG. 14 is a front longitudinal sectional view of a tantalum solid state electrolytic capacitor using the capacitor device according to the second embodiment.

DESCRIPTION OF THE PREFERRED EMBODIMENTS

Hereinafter, embodiments of the present invention will be described.

Figure 1:
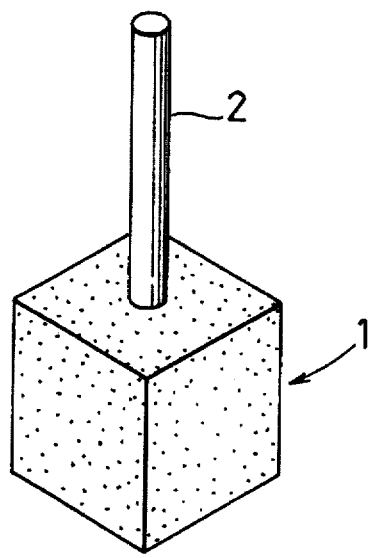
FIG. 1 is a perspective view showing the condition where a lead wire is fixed to a chip in a conventional method.
Figure 2:
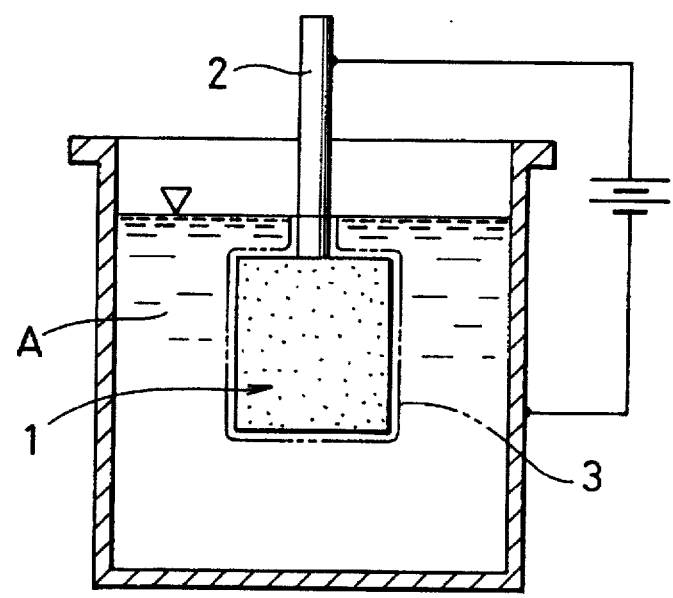
FIG. 2 is a cross-sectional view showing the condition where anodic oxidation is caused in the conventional method.
Figure 3:
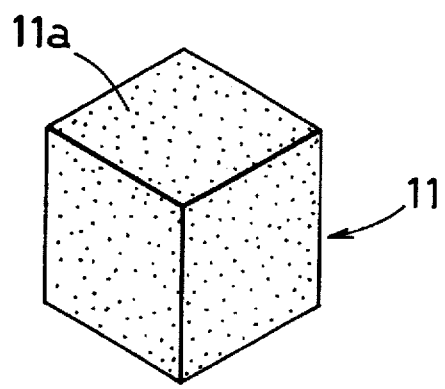
FIG. 3 is a perspective view of a chip in a first embodiment of the present invention.
Figure 4:
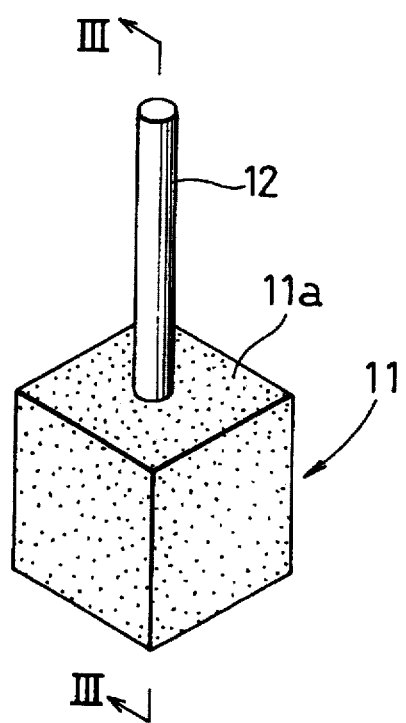
FIG. 4 is a perspective view showing the condition where a lead wire is fixed to the chip.
Figure 5:
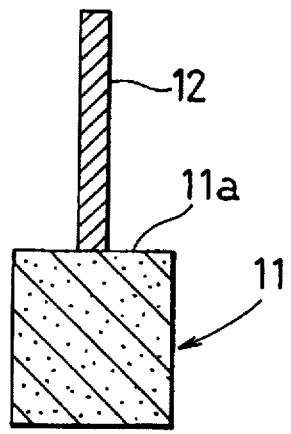
FIG. 5 is a cross-sectional view taken on line III—III of FIG. 4.

FIGS. 3 to 9 show a first embodiment. The first embodiment is formed in the following manner: First, as shown in FIG. 3, tantalum powder is hardened and shaped into a porous chip 11 and sintered, and as shown in FIG. 4, a lead wire 12 made of a metal such as copper or aluminum is fixed to one end surface 11a of the chip 11 by welding or by conductive adhesive agent. The lead wire 12 may be fixed by being imbedded in the chip 11 when the chip 11 is hardened and shaped.

Then, as shown in FIGS. 6 and 7, an insulating material 15 such as heat resistant synthetic resin, e.g. polyimide resin, or glass is applied to the root of the lead wire 12 where it is fixed to the chip 11 and then dried. Since a part of the insulating material 15 applied there intrudes into a part of the porous chip 11, the entire surface of the root of the lead wire 12 where it is fixed to the chip 11 is covered.

Then, as shown in FIG. 8, a dielectric film 13 of tantalum pentoxide is formed on the surface of each tantalum powder of the chip 11 by drenching the chip 11 in the chemical conversion solution A such as an aqueous solution of phosphoric acid so that the chemical conversion solution A infiltrates into the chip 11 and by applying a direct current between the lead wire 12 and the chemical conversion solution A under this condition to cause anodic oxidation.

Since the insulating material 15 is applied in advance to the root of the lead wire 12 in the anodic oxidation, when the chip 11 is drenched in the chemical conversion solution A, it is surely prevented by the insulating material 15 that a portion of the lead wire 12 which protrudes from the chip 11 is directly in contact with the chemical conversion solution. In other words, since the occurrence of a short circuit phenomenon of current between the lead wire 12 and the chemical conversion solution A is surely prevented by the insulating material 15 applied to the lead wire 12 in advance, even if a wire made of a metal other than tantalum such as copper or aluminum which is inexpensive is used as the lead terminal 12, the anodic oxidation of the tantalum powder of the chip 11 is surely caused.

4

After the dielectric film 13 of tantalum pentoxide is thus formed on the chip 11 through the anodic oxidation, then, like in the conventional method, the chip 11 is drenched in an aqueous solution of manganese nitrate and taken out therefrom to be sintered, and by repeating this a plurality of times, a solid state electrolytic layer of manganese dioxide is formed on the surface of the dielectric film 13 of tantalum pentoxide, and further, a graphite layer and a cathode electrode film 14 including a metallic layer such as a silver or a nickel layer are formed on the surface of the solid state electrolytic layer of manganese dioxide to obtain a capacitor device 10 as shown in FIG. 9.

After the lead wire 12 is cut to an appropriate length so that a part thereof is left, the capacitor device 10 thus manufactured is arranged, as shown in FIG. 10, between a pair of left and right plate-shaped metallic lead terminals 16 and 17 by fixing the lead wire 12 to one lead terminal 16 by welding, etc., and after the other lead terminal 17 is connected to the cathode electrode film 14 of the chip 11 directly or through a non-illustrated fuse wire, the entire structure is encapsulated in a molding member 18 made of synthetic resin. Thus, a tantalum solid state electrolytic capacitor is completed.

While manganese dioxide is formed as the solid state electrolytic layer in the above-described example, a film of a polymer resin such as polypyrrole may be formed as the solid state electrolytic layer.

FIGS. 11 and 12 show a second embodiment. In the second embodiment, in applying the insulating material 15 such as heat resistant resin or glass to the root of the lead wire 12 fixed to the chip 11, the insulating material 15 is, as shown in FIG. 11, infiltrated a length L from the end surface 11 a of the chip 11 to form a non-porous portion 11 b at the end surface of the chip 11.

Then, by causing anodic oxidation in the manner described above, the dielectric film of tantalum pentoxide is formed. Then, by repeating the drenching and taking out of the chip 11 in and from the aqueous solution of manganese nitrate and the sintering a plurality of times like the above-described process, the solid state electrolytic layer of manganese dioxide is formed on the surface of the dielectric film, and by forming a graphite layer and the cathode electrode film 14 including a layer of a metal such as silver or nickel on the surface of the solid state electrolytic layer of manganese dioxide, a capacitor device 10' as shown in FIG. 12 is obtained.

According to this method, in forming the solid state electrolytic layer of manganese dioxide, the aqueous solution of manganese nitrate does not infiltrate into the non-porous portion 11b of the chip 11, so that it is prevented that the solid state electrolytic layer of manganese dioxide is formed at the non-porous portion 11b. In other words, each tantalum powder of the chip 11 and the solid state electrolytic layer of manganese dioxide are surely electrically isolated (insulated) from each other by the non-porous portion 11b.

Consequently, in completing a tantalum solid state electrolytic capacitor by using the capacitor device 10' thus manufactured, after the solid state electrolytic layer is formed or after the cathode electrode film 14 is formed, the lead wire 12 used in manufacturing the capacitor 10' can be removed at the root where it is fixed to the chip 11. In other words, the capacitor 10' can be formed to be leadless.

Specifically, as shown in FIG. 13, the end surface 11a of the leadless chip 11 from which the lead wire 12 is removed by cutting or exfoliation is surface-processed so that the tantalum powder of the non-porous portion 11b is exposed out of the end surface 11a. Then, as shown in FIG. 14, an anode terminal electrode film 19 including a layer of a metal such as solder is formed on the end surface 11a and the periphery of the chip 11 is covered with a covering film 20 made of heat resistant synthetic resin or glass, so that a tantalum solid state electrolytic capacitor as shown in FIG. 10 not having any metallic lead terminal, in other words, a tantalum solid state electrolytic capacitor of a leadless type is realized. As a result, the tantalum solid state electrolytic capacitor is greatly reduced in size and increased in capacitance compared to the tantalum solid state electrolytic capacitor shown in FIG. 10.

Obviously, many modifications and variations of the present invention are possible in light of the above teachings. It is therefore to be understood that within the scope of the appended claims, the invention may be practiced other than as specifically described.

What is claimed is:

1. A capacitor device manufacturing method comprising the steps of:

preparing a tantalum sintered body having a copper or aluminum lead wire on one end surface thereof;

applying an insulating material to a surface of a root portion of the lead wire adjacent to the tantalum sintered body;

drenching the tantalum sintered body and a part of the root portion of the lead wire, to which the insulating material is applied, in a chemical conversion solution;

causing anodic oxidation by applying a current between the lead wire and the chemical conversion solution to form a dielectric film on a surface of the tantalum sintered body;

forming a solid state electrolytic layer on a surface of the dielectric film; and forming a cathode electrode film on a surface of the solid state electrolytic layer.

2. A capacitor device manufacturing method according to claim 1, wherein said tantalum sintered body having the lead wire on one end surface thereof is prepared by hardening and shaping tantalum powder into a porous chip;

sintered the porous chip to convert it into a sintered body; and fixing the lead wire to one end surface of the sintered body.

3. A capacitor device manufacturing method according to claim 1, wherein said tantalum sintered body having the lead wire on one end surface thereof is prepared by hardening and shaping tantalum powder with a part of the lead wire imbedded therein into a porous chip having the lead wire on one end surface thereof; and sintering the porous chip to convert it into a sintered body.

4. A capacitor device manufacturing method according to claim 1, wherein said lead wire is fixed to one end surface of the tantalum sintered body, and wherein the insulating material is continuously formed between the one end surface of the tantalum sintered body and the surface of the lead wire.

5. A capacitor device manufacturing method according to claim 4, wherein the insulating material is applied to the end surface of the tantalum sintered body so as to infiltrate into the tantalum sintered body, and after the solid state electrolytic layer is formed, the lead wire is cut at the connection with the tantalum sintered body.

6. A capacitor device manufacturing method according to claim 5, wherein an anode electrode film is formed at the end surface of the tantalum sintered body after the lead wire is cut.

* * * * *